(12) United States Patent
Pahl et al.

(10) Patent No.: US 7,537,103 B2
(45) Date of Patent: May 26, 2009

(54) PORTAL-TYPE SCRAPER RECLAIMER WITH BENT RECLAIMER BOOM

(75) Inventors: Ulrich Pahl, Parker, CO (US); Ruben Lezius, Aurora, CO (US)

(73) Assignee: ThyssenKrupp Foerdertechnik GmbH, Essen (DE)

( * ) Notice: Subject to any disclaimer, the term of this patent is extended or adjusted under 35 U.S.C. 154(b) by 0 days.

(21) Appl. No.: 11/739,820

(22) Filed: Apr. 25, 2007

(65) Prior Publication Data
US 2008/0264762 A1 Oct. 30, 2008

(51) Int. Cl.
*B65G 65/02* (2006.01)
(52) U.S. Cl. .................... 198/519; 198/508
(58) Field of Classification Search ............ 198/318, 198/508, 519, 861.5, 511; 414/325, 327
See application file for complete search history.

(56) References Cited

U.S. PATENT DOCUMENTS

| 1,272,655 | A | * | 7/1918 | Gawlet | 198/519 |
| 3,050,881 | A | * | 8/1962 | Brown | 198/511 |
| 3,908,837 | A | * | 9/1975 | Strocker | 198/519 |
| 4,042,094 | A | * | 8/1977 | Schmermund | 198/347.1 |
| 5,540,533 | A | * | 7/1996 | Eskelinen | 414/327 |

FOREIGN PATENT DOCUMENTS

| DE | 1 985 978 U | 5/1968 |
| DE | 6 925 369 | 6/1969 |
| DE | 26 14 999 | 11/1977 |
| DE | 86 20 188.3 | 11/1986 |
| DE | 37 35 796 A1 | 5/1989 |
| DE | 38 00 605 A1 | 7/1989 |

* cited by examiner

*Primary Examiner*—James R Bidwell
(74) *Attorney, Agent, or Firm*—McGlew & Tuttle, P.C.

(57) ABSTRACT

A portal-type scraper reclaimer having a support structure 10 and a boom 16. The support structure 10 includes end support members 12. The boom 16 has a main portion 17 and an end portion 15. The end portion 15 is bent relative to the main portion 17. The boom 16 is connected to the end support member 12 at a pivot 26 so that the boom moves relative to the end support member 12. A pair of support sprockets 20 and a pair of drive sprockets 18 are connected to the end support member 12. A boom sprocket 22 is fixed to the boom 16. A scraper chain conveyor 24 extends along the boom 16. The described pairs of sprockets 18, 20, 22 guide the scraper chain conveyor 24.

20 Claims, 4 Drawing Sheets

PORTAL-TYPE SCRAPER RECLAIMER WITH BENT RECLAIMER BOOM

FIELD OF THE INVENTION

The present invention relates to a portal-type scraper reclaimer having a bent boom.

BACKGROUND OF THE INVENTION

Portal-type scraper reclaimers for indoor installations featuring two reclaimer booms with a pair of traversing scraper chains and scraper flights are already known. This arrangement is used to avoid interference with a roof structure. Portal reclaimers for outdoor installations having a single reclaimer boom are also known. To reclaim the stacked material, the reclaimer booms are lowered until the scraper flights engage in the material while the portal reclaimer moves along the pile. The scraped material is loaded onto a yard conveyor alongside the pile.

Portal-type scraper reclaimers of the known type use either a hinged straight boom and a loading table or a hinged straight boom with an inclined loading chute. The use of such reclaimers result in unreclaimable material in the pile or a reduced pile cross-section or require a wider rail gauge. If the unreclaimable material dries up it that can lead to severe dust problems. The portal-type scraper reclaimer using a hinged straight boom for loading an aboveground receiving conveyor requires a concrete loading table. The concrete loading table significantly increases the cost of such portal-type scraper reclaimers. The known portal-type scraper reclaimers disadvantageously fail to maximize pile inventory. This results in unreclaimable material left in the pile bottom ("wedge").

SUMMARY OF THE INVENTION

It is the object of the present invention to provide a reclaimer that maximizes pile inventory by leaving a minimal amount, if any, of unreclaimable material.

According to the invention, a new type of reclaimer is provided for reclaiming material. The reclaimer has a support structure and a boom. The boom has a main part and an end part. The end part of the boom is bent at an angle relative to the main part of the boom. The boom is connected to the support structure at a pivot point so that the boom pivots relative to the support structure. A pair of support sprockets is fixed to the support structure. A pair of drive sprockets is connected to the support structure. A pair of boom sprockets is fixed to the boom. A scraper chain conveyor extends along the boom. The scraper chain is conveyed or guided by the support sprockets, the boom sprockets and the drive sprockets to form a material transporting path.

The drive sprockets and the support sprockets define a fixed conveyor path. The support sprockets and the boom sprockets define a variable conveyor path that varies based on a position of the boom.

The support structure has end support members mounted for movement along a support frame path. A conveyor extends in a direction of the support frame path.

The reclaimer has a means for moving the boom.

The reclaimer has a means for moving the scraper chain conveyor.

Scraper elements are attached at spaced locations to the scraper chain conveyor.

The reclaimer may have a loading chute. The loading chute has a discharge means to discharge material transported by the scraper chain conveyor.

The location of the pivot that connects the boom to the support structure is located at a spaced location from an end support member.

A conveyor is provided for receiving material transported by the scraper chain conveyor.

The reclaimer may include a loading table for handling coarse material. The boom may have another bent portion in which the main part is bent at an angle relative to the another bent portion and the end part is bent at an angle relative to the other bent portion.

According to the invention, the reclaimer may have a support structure. The support structure includes an end support member. A boom may be provided having a main part and an end part. The end part is bent at an angle relative to the main part. The boom is connected to the end support member at a pivot so that the boom pivots relative to the end support member. A drive roller is connected to the end support member. A support roller is fixed to the boom via the end support member. A scraper chain conveyor extends along the boom. The drive roller and the support roller form a fixed portion of a material transporting path.

Another roller may be mounted to the boom. The support roller and another roller define a variable conveyor path that varies based on a position of the boom.

The end support members may be mounted for movement along a rail.

A conveyor extends in a direction of the rail.

According to the invention, the reclaimer may include a support structure and a boom. The boom has a first boom portion and a second boom portion. The second boom portion is bent at an angle relative to the first boom portion. The boom is connected to the support structure at a pivot so that the boom pivots relative to the support structure. A support pulley is fixed to the support structure. A drive pulley is connected to the support structure. A boom pulley is fixed to the boom. A scraper chain conveyor is guided along a material transporting path by the support pulley, the drive pulley and the boom pulley. The support pulley and the drive pulley define a fixed portion of the material transporting path. The support pulley and the boom pulley define a variable portion of the material transporting path that varies based on a position of the boom.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
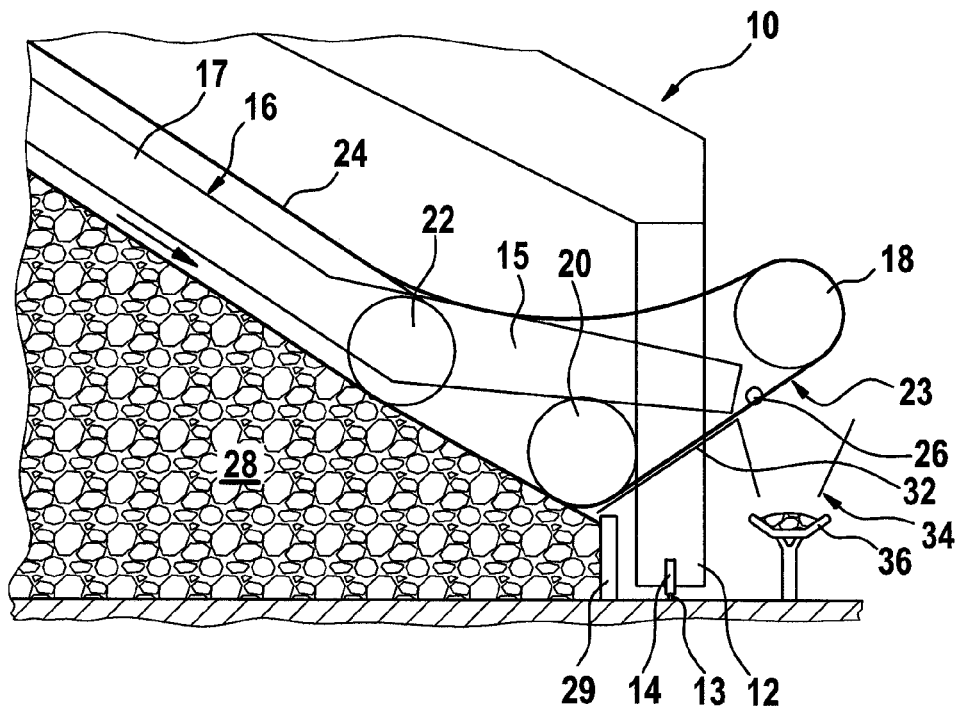
FIG. 1 is a schematic side view of a first embodiment of the portal-type scraper reclaimer depicting the boom in an inclined position.

Referring to the drawings in particular, FIG. 1 shows a schematic view of the first embodiment of the portal-type scraper reclaimer. The portal-type scraper reclaimer has a support structure 10. The support structure 10 includes end support members 12. The end support members 12 have support mounts 14 mounted to a rail 13 allowing the entire support structure to move along the rail 13. This allows the support structure 10 to move along the stockpile or to move to another stockpile. The support structure 10 spans a stockpile 28 of material contained within a retaining wall 29. A boom 16 is pivotably mounted to the support structure 10 at a pivot 26. One or more booms 16 may be mounted to the support structure 10. The pivot 26 allows the boom 16 to pivot relative to the support structure 10. The pivot 26 is located at a spaced location from the end support member 12. The boom 16 has an end portion 15 and a main portion 17. The end portion 15 of the boom is bent at an angle relative to the main portion 17 of the boom. In FIG. 1, the boom 16 is shown at an inclined position. The boom 16 is able to move lower as the height of the stockpile 28 of material decreases.

A drive sprocket (roller, pulley or the like) 18 is fixed to the end support member 12. A support sprocket (roller, pulley or the like) 20 is also connected to the end support member 12. A pair of boom sprockets (roller, pulley or the like) 22 is mounted to the boom 16 and aids in guiding a scraper chain conveyor 24. The scraper chain conveyor 24 is guided by sprockets including support sprocket 20, boom sprocket 22 and is driven by drive sprocket 18 along the boom 16. The support sprocket 20 and the drive sprocket 18 guide the chain conveyor 24 along a fixed portion of a material transporting path 23. The drive sprocket 18 drives the scraper chain conveyor 24 in a material transporting direction as indicated by the arrow shown in FIG. 1 when reclaiming material. The chain travel direction of the chain conveyor 24 is reversible so that the chain conveyor 24 can travel opposite the indicated travel direction when stacking material. The scraper chain conveyor 24 moves the material from the stockpile 28 up a loading chute 32 that follows the fixed portion of the material transporting path 23. The loading chute 32 can have a minimum incline of 15° and a maximum incline of 60°. The loading chute 32 has a discharge chute 34 that allows the transported material to be loaded on to a conveyor 36. The conveyor 36 further transports the reclaimed material to another location.

Figure 2:
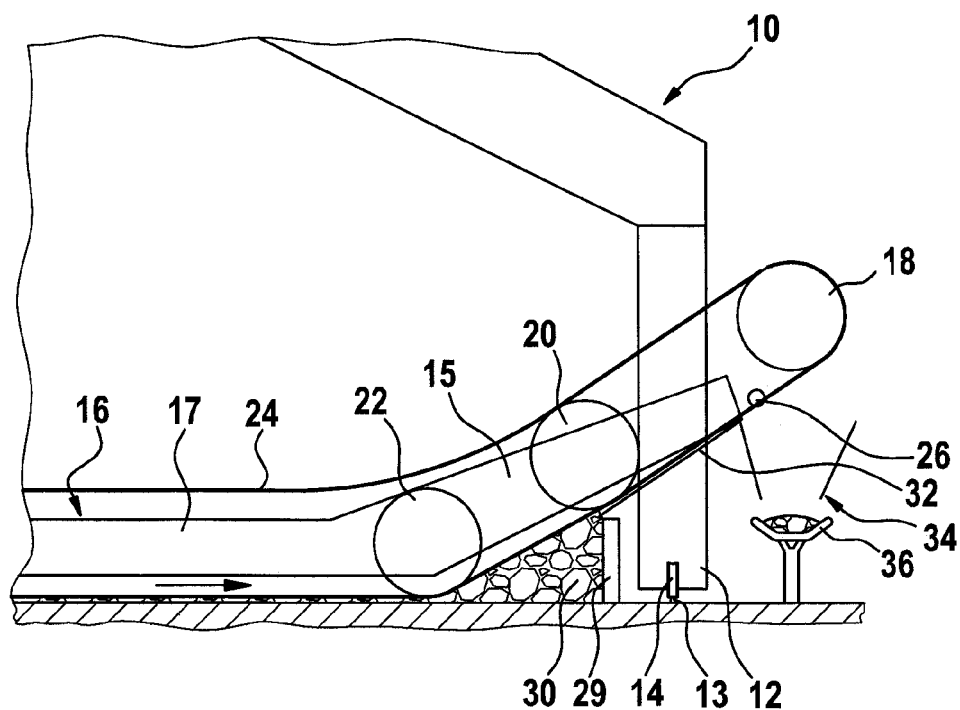
FIG. 2 is a schematic side view of the first embodiment of the portal-type scraper reclaimer depicting the boom in a bottom position.

FIG. 2 shows the boom in a bottom position. The end portion 15 being bent relative to the main portion 17 allows the boom 16 to transport a majority of the material leaving only a minimal amount of unreclaimable material 30, if any, that cannot be transported by the scraper chain conveyor 24.

Figure 3:
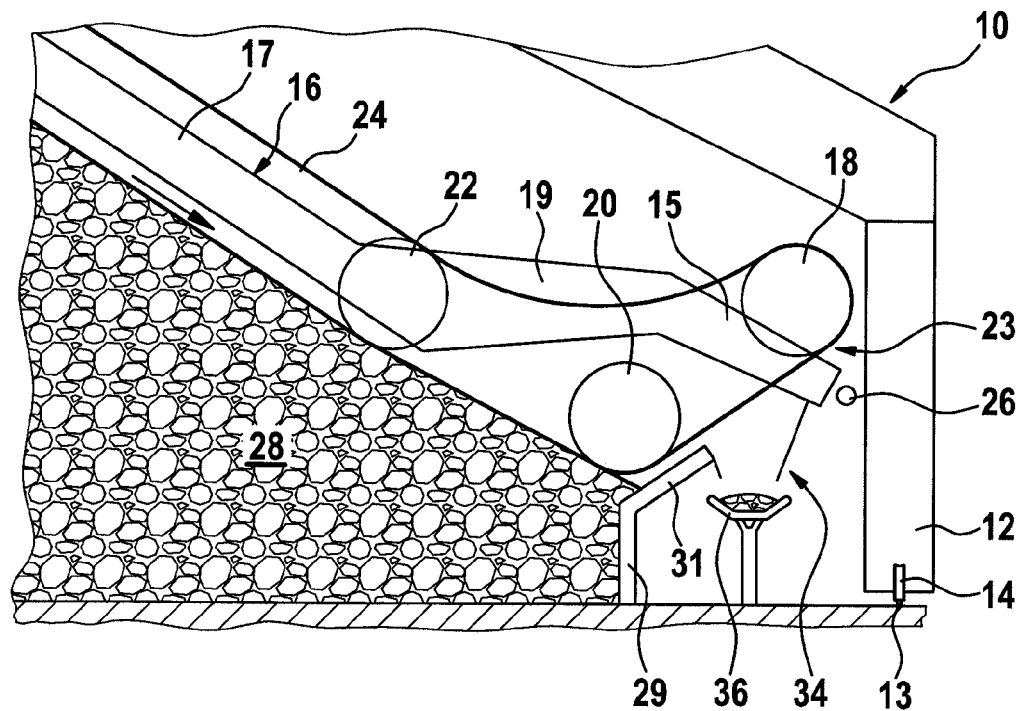
FIG. 3 is a schematic side view of a second embodiment of the portal-type scraper reclaimer depicting the boom in an inclined position.

FIG. 3 shows a second embodiment of the portal-type scraper reclaimer, which can be particularly used for transporting coarse material. The portal-type scraper reclaimer has a boom 16 having a main portion 17, a middle portion 19 and an end portion 15. The end portion 15 is bent relative to the middle portion 19. The middle portion 19 is bent relative to the main portion 17. The portal-type reclaimer has a support structure 10. Support structure 10 has movable end support members 12. The movable end support members 12 have support mounts 14 for mounting to a rail 13. This allows the support structure 10 to move to another area in which material has to be moved. The support structure 10 spans a stockpile 28 of material contained within a loading table 31. A boom 16 is pivotably mounted to the end support structure 12 at a pivot 26. The pivot 26 allows the boom 16 to move relative to the support structure 10. The pivot 26 is located at a spaced location from the end support member 12. The boom 16 has an end portion 15 and a main portion 17. In FIG. 3, the boom 16 is shown at an inclined position. The boom 16 is able to move lower as the height of the stockpile 28 of material decreases.

Figure 5:
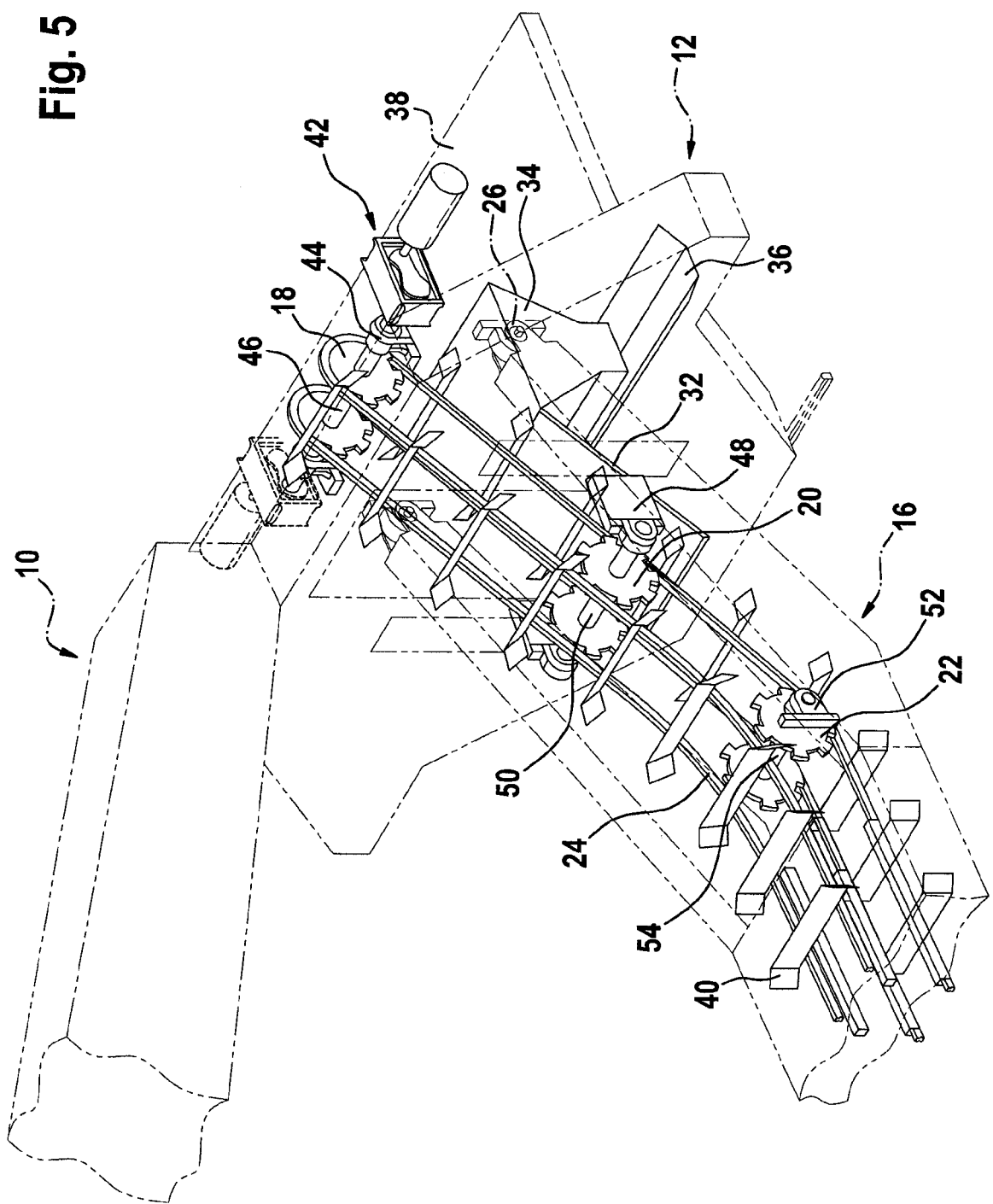
FIG. 5 is a perspective view of the first embodiment of the portal-type scraper reclaimer.

A drive sprocket (roller, pulley or the like) 18 is fixed to the end support member 12 (FIG. 5). A support (roller, pulley or the like) 20 is also fixed to the end support member 12 (FIG. 5). A pair of boom sprockets (roller, pulley or the like) 22 is mounted to the boom 16 and aids in guiding the scraper chain conveyor 24. The scraper chain conveyor 24 is guided by sprockets including support sprocket 20, boom sprocket 22 and is driven by drive sprocket 18 along the boom 16. The support sprocket 20 and the drive sprocket 18 guide the chain conveyor 24 along a fixed portion of a material transporting path 23. The drive sprocket 18 drives the scraper chain conveyor 24 in a material transporting direction as indicated by the arrow in FIG. 3 when reclaiming material. The chain travel direction of the chain conveyor 24 is reversible so that the chain conveyor 24 can travel opposite the indicated travel direction when stacking material. The scraper chain conveyor 24 moves the material from the stockpile 28 up a loading table 31 that follows the fixed portion of the material transporting path so that the material is discharged to a conveyor 36. The loading table 31 is better suited for the transportation of coarse material than that of the loading chute 32 of the first embodiment of the portal-type scraper reclaimer (FIG. 1). The conveyor 36 further transports the material to another location.

Figure 4:
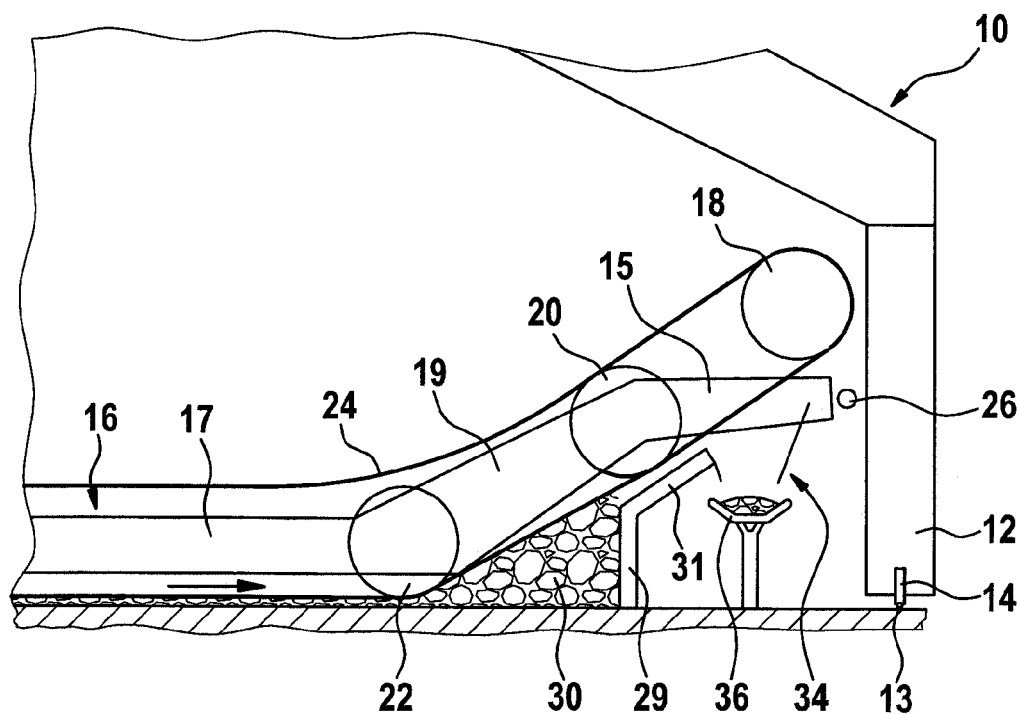
FIG. 4 is a schematic side view of the second embodiment of the portal-type scraper reclaimer depicting the boom in a bottom position.

FIG. 4 shows the boom 16 in a bottom position in which the majority of the stockpile material has been transported. The end portion 15 being bent relative to the middle portion 19 and main portion 17 being bent relative to the middle portion 17 allows boom 16 to transport a majority of the material leaving only a minimal amount, if any, of unreclaimable material 30 that cannot be transported by the scraper chain conveyor 24.

Figure 6:
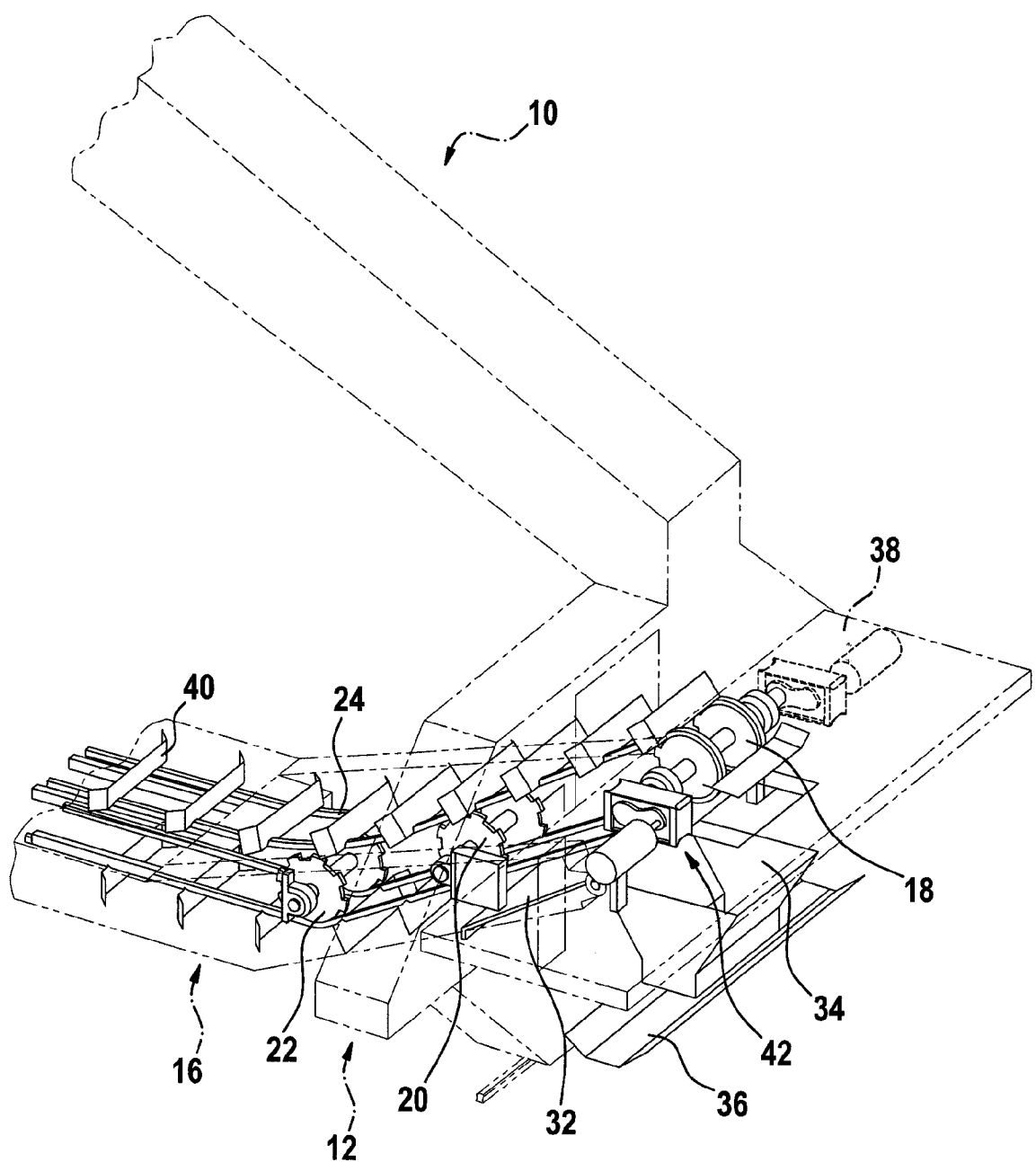
FIG. 6 is another perspective view of the first embodiment of the portal-type scraper reclaimer.

FIGS. 5 and 6 show two different perspective views of the first embodiment of the portal-type scraper reclaimer. The drive sprocket 18 is mounted to a connection piece 38 via mounts 44. The connection piece 38 is connected to the end support member 12. A motor 42 drives the drive sprocket 18, which causes the scraper chain conveyor 24 to move. A shaft 46 passes through mounts 44 to connect the drive sprocket 18 to motor 42. Support sprocket 20 is mounted to the end support member 12 via mounts 48. A shaft 50 connects the support sprocket 20 to the mounts 48. The boom sprocket 22 is fixed to the boom 16 via mounts 52. A shaft 54 connects the boom sprocket 22 to the mounts 52. Scraper elements 40 are mounted along the scraper chain conveyor 24 at spaced locations. The scraper elements 40 move the material up the loading chute 32 to be discharged at the discharge chute 34. The conveyor 36 then transports the discharged material to another location.

While specific embodiments of the invention have been shown and described in detail to illustrate the application of the principles of the invention, it will be understood that the invention may be embodied otherwise without departing from such principles.

The invention claimed is:

1. A reclaimer comprising:
   a support structure;
   a boom having a main part and an end part, said end part being bent at an angle relative to said main part, said boom being connected to said support structure at a pivot such that said boom pivots relative to said support structure;
a support sprocket fixed to said support structure;
a drive sprocket connected to said support structure;
a boom sprocket fixed to said boom;
an endless scraper chain conveyor extending continuously along said boom, said scraper chain being guided by said support sprocket, said boom sprocket and said drive sprocket forming a material transporting path.

2. A reclaimer in accordance with claim 1, wherein said drive sprocket and said support sprocket define a fixed conveyor path and said support sprocket and said boom sprocket define a variable conveyor path that varies based on a position of said boom.

3. A reclaimer in accordance with claim 1, wherein said support structure has end support members mounted for movement along a support frame path.

4. A reclaimer in accordance with claim 3, further comprising a conveyor extending in a direction of said support frame path.

5. A reclaimer in accordance with claim 1, further comprising a means for moving said scraper chain conveyor.

6. A reclaimer in accordance with claim 1, wherein scraper elements are attached at spaced locations to said scraper chain conveyor.

7. A reclaimer in accordance with claim 1, further comprising a loading chute having a discharge means.

8. A reclaimer in accordance with claim 3, wherein said pivot is located at a spaced location from said end support member.

9. A reclaimer in accordance with claim 1, further comprising a conveyor for receiving material transported by said scraper chain conveyor.

10. A reclaimer in accordance with claim 1, further comprising a loading table for handling coarse material, said boom comprising another bent portion, said main part being bent at an angle relative to said another bent portion and said end part being bent at an angle relative to said another bent portion.

11. A reclaimer comprising:
a support structure having an end support member;
a boom having a main part and an end part, said end part being bent at an angle relative to said main part, said boom being connected to said end support member at a pivot such that said boom pivots relative to said end support member;
a drive roller connected to said end support member;
a support roller fixed to said end support member;
an endless scraper chain conveyor extending continuously along said boom, said drive roller and said support roller forming a fixed portion of a material transporting path.

12. A reclaimer in accordance with claim 11, further comprising another roller mounted to said boom, said support roller and said another roller defining a variable conveyor path that varies based on a position of said boom.

13. A reclaimer in accordance with claim 11, wherein said end support member is mounted for movement along a rail.

14. A reclaimer in accordance with claim 13, further comprising a conveyor extending in a direction of said rail.

15. A reclaimer in accordance with claim 11, further comprising a means for moving said scraper chain conveyor.

16. A reclaimer in accordance with claim 11, wherein scraper elements are attached at spaced locations to said scraper chain conveyor.

17. A reclaimer in accordance with claim 11, further comprising a loading chute having a discharge means.

18. A reclaimer in accordance with claim 11, further comprising a loading table for handling coarse material, said boom having another bent portion, said main part being bent at an angle relative to said another bent portion, said end part being bent at an angle relative to said bent portion.

19. A reclaimer comprising:
a support structure;
a boom having a first boom portion and a second boom portion, said second boom portion being bent at an angle relative to said first boom portion, said boom being connected to said support structure at a pivot such that said boom pivots relative to said support structure;
a support pulley fixed to said support structure;
a drive pulley connected to said support structure;
a boom pulley fixed to said boom;
an endless scraper chain conveyor guided continuously along a material transporting path via said support pulley, said drive pulley and said boom pulley, said support pulley and said drive pulley defining a fixed portion of said material transporting path, said support pulley and said boom pulley defining a variable portion of said material transporting path that varies based on a position of said boom.

20. A reclaimer in accordance with claim 19, further comprising a loading table for handling coarse material, said boom having another bent portion, said main part being bent at an angle relative to said another bent portion, said end part being bent at an angle relative to said bent portion.

* * * * *